(12) United States Patent
Zhang et al.

(10) Patent No.: US 10,170,795 B2
(45) Date of Patent: Jan. 1, 2019

(54) ELECTROLYTE FOR HIGH EFFICIENCY CYCLING OF SODIUM METAL AND RECHARGEABLE SODIUM-BASED BATTERIES COMPRISING THE ELECTROLYTE

(71) Applicant: Battelle Memorial Institute, Richland, WA (US)

(72) Inventors: Ji-Guang Zhang, Richland, WA (US); Ruiguo Cao, Richland, WA (US); Wesley A. Henderson, Richland, WA (US); Kuber Mishra, Columbia, SC (US); Wu Xu, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 205 days.

(21) Appl. No.: 14/869,647

(22) Filed: Sep. 29, 2015

(65) Prior Publication Data
US 2016/0072151 A1    Mar. 10, 2016

Related U.S. Application Data

(63) Continuation-in-part of application No. 14/482,312, filed on Sep. 10, 2014.

(51) Int. Cl.
*H01M 10/0568*  (2010.01)
*H01M 10/054*  (2010.01)
(Continued)

(52) U.S. Cl.
CPC ....... *H01M 10/0568* (2013.01); *H01M 4/381* (2013.01); *H01M 4/5815* (2013.01);
(Continued)

(58) Field of Classification Search
CPC ............. H01M 10/056; H01M 10/446; H01M 10/0525; H01M 10/054; H01M 10/0568;
(Continued)

(56) References Cited

U.S. PATENT DOCUMENTS

| 6,805,999 B2 | 10/2004 | Lee et al. |
| 7,632,602 B2 | 12/2009 | Lee et al. |

(Continued)

FOREIGN PATENT DOCUMENTS

| CN | 103123981 | 5/2013 |
| WO | WO 2004/109823 A1 | 12/2004 |

(Continued)

OTHER PUBLICATIONS

Niedzicki et al (Optimization of the Lithium-ion cell electrolyte composition through the use of the LiTDI salt. Warsaw Universtiy of Technology. Electrochim. Acta 117C (2014) 224-229).*
(Continued)

*Primary Examiner* — Stephen J Yanchuk
(74) *Attorney, Agent, or Firm* — Klarquist Sparkman, LLP

(57) ABSTRACT

Embodiments of a non-aqueous electrolyte for a rechargeable sodium (Na)-based battery comprise a sodium salt and a nonaqueous solvent, the electrolyte having a sodium salt concentration ≥2.5 M or a solvent-sodium salt mole ratio ≤4:1. Na-based rechargeable batteries including the electrolyte exhibit both high cycling stability and high coulombic efficiency (CE). Some embodiments of the disclosed batteries attain a CE≥80% within 10-30 charge-discharge cycles and maintain a CE≥80% for at least 100 charge-discharge cycles. In certain embodiments, the battery is an anode-free battery in the as-assembled initial state.

16 Claims, 11 Drawing Sheets

(51) Int. Cl.
    *H01M 10/0569*    (2010.01)
    *H01M 4/38*    (2006.01)
    *H01M 4/66*    (2006.01)
    *H01M 4/58*    (2010.01)

(52) U.S. Cl.
    CPC ........... *H01M 4/661* (2013.01); *H01M 4/663* (2013.01); *H01M 10/054* (2013.01); *H01M 10/0569* (2013.01); *H01M 2300/0025* (2013.01); *H01M 2300/0028* (2013.01); *H01M 2300/0037* (2013.01)

(58) Field of Classification Search
    CPC .. H01M 10/0569; H01M 4/136; H01M 4/661; H01M 4/5825; H01M 2/1653; H01M 2010/4292; H01M 2300/0017; H01M 2300/002; H01M 2300/0022; H01M 2300/0037; H01M 2300/0028; H01M 10/399
    See application file for complete search history.

(56) References Cited

U.S. PATENT DOCUMENTS

| | | | |
|---|---|---|---|
| 8,722,256 B2 | 5/2014 | Narula et al. | |
| 9,543,613 B2 | 1/2017 | Ihara et al. | |
| 2004/0253510 A1* | 12/2004 | Jonghe | H01M 4/13 429/137 |
| 2008/0026292 A1 | 1/2008 | Paulsen et al. | |
| 2009/0212743 A1 | 8/2009 | Hagiwara et al. | |
| 2011/0104526 A1* | 5/2011 | Boxley | H01M 2/1646 429/50 |
| 2012/0058393 A1* | 3/2012 | Fukunaga | H01M 4/381 429/200 |
| 2013/0052525 A1* | 2/2013 | Kageura | H01M 4/133 429/200 |
| 2015/0050561 A1 | 2/2015 | Zhang et al. | |
| 2015/0295236 A1* | 10/2015 | Senguttuvan | H01M 4/485 429/300 |
| 2016/0268661 A1 | 9/2016 | Kim et al. | |
| 2016/0359158 A1* | 12/2016 | Janakiraman | H01M 2/1653 |

FOREIGN PATENT DOCUMENTS

| | | | |
|---|---|---|---|
| WO | WO 2013/004957 | * | 1/2013 |
| WO | WO 2015/057808 A1 | | 4/2015 |
| WO | WO 2015/080492 | | 6/2015 |

OTHER PUBLICATIONS

Gmyrek (Effects of Electrolyte Concentration on the Performance of Batteries).*
Forero et al (Effects of High and Low Salt Concentration in Electrolytes at Lithium-Metal Anode Surfaces. J. Phys. Chem. 2017, 121, 182-194).*
Aurbach, D., et al., "The Application of Atomic Force Microscopy for the Study of Li Deposition Processes," *Journal of the Electrochemical Society* 1996, 143(11):3525-3532.
Bates, J. B., et al., "Fabrication and characterization of amorphous lithium electrolyte thin films and rechargeable thin-film batteries," *Journal of Power Sources* 1993, 43-44:103-110.
Bates, J. B., et al., "Thin-film rechargeable lithium batteries," *Journal of Power Sources* 1995, 54:58-62.
Kim, J. et al., "Rechargeable Seawater Battery and Its Electrochemical Mechanism," *ChemElectroChem Communications* 2015, 2:328-332.
Neudecker, B. J., et al., "'Lithium-Free' Thin-Film Battery with In Situ Plated Li Anode," *Journal of the Electrochemical Society* 2000, 147(2):517-523.
Park, M. S., et al., "A Highly Reversible Lithium Metal Anode," *Scientific Reports*, 4, 3815, doi:10.1038/srep038515.
Whittingham, M. S., "History, Evolution, and Future Status of Energy Storage," *Proceedings of the IEEE* 2012, 100:1518-1534.
Woo, J., et al., "Symmetrical Impedance Study on Inactivation Induced Degradation of Lithium Electrodes for Batteries Beyond Lithium-Ion," *Journal of the Electrochemical Society* 2014, 161(5):A827-A830.
Final Office Action from U.S. Appl. No. 14/482,312, dated Jun. 27, 2017.
Lopez et al., "Morphological Transitions on Lithium Metal Anodes," *J. Electrochem. Soc.* 2009, 156:A726-A729. (Abstract only).
Office Action, dated Feb. 28, 2017, issued in related U.S. Appl. No. 14/482,312.
Steiger et al., "Microscopic observations of the formation, growth and shrinkage of lithium moss during electrodeposition and dissolution," *Electrochim. Acta*, Aug. 2014, 136:529-536. (Abstract only).
Xu, et al., "Lithium metal anodes for rechargeable batteries," *Energy & Environmental Science*, 2014, 7: 512-537.

* cited by examiner

ELECTROLYTE FOR HIGH EFFICIENCY CYCLING OF SODIUM METAL AND RECHARGEABLE SODIUM-BASED BATTERIES COMPRISING THE ELECTROLYTE

CROSS REFERENCE TO RELATED APPLICATION

This application is a continuation-in-part of U.S. application Ser. No. 14/482,312, filed Sep. 10, 2014, which is incorporated in its entirety herein by reference.

ACKNOWLEDGMENT OF GOVERNMENT SUPPORT

This invention was made with government support under Contract DE-AC05-76RL01830, awarded by the U.S. Department of Energy. The government has certain rights in the invention.

FIELD

Disclosed are concentrated electrolytes for use in rechargeable sodium (Na)-based batteries with high Coulombic efficiency (CE). Rechargeable sodium batteries including the concentrated electrolytes are also disclosed.

BACKGROUND

Energy storage devices such as batteries with high energy density and power density, long cycle life and calendar life, good safety and low cost are in high demand to supply power for electronic devices, electric vehicles (EVs) and smart grid. To date, lithium (Li)-ion batteries have been one of the most widely used energy storage systems for portable electronics and EVs. However, the high cost of Li-ion batteries has hindered their adoption for large-scale electric energy storage applications. The large-scale deployment of inexpensive energy storage systems will be transformational for the electric grid by enabling a much larger fraction of electrical energy production from renewable (intermittent) sources. Room temperature stationary Na-based batteries have attracted attention for the applications of renewable energy and the smart grid because of their potential low cost and the abundant sodium resources.

Essential criteria required for large-scale electric utility grid systems and/or large battery packs for vehicles include low cost, high safety, high energy density/efficiency and long cycle life. Na-based batteries offer a highly enticing option as such batteries may be based upon low cost, Earth-abundant materials, available from the oceans, salt brines, and geological deposits. For example, the current price for lithium carbonate is about $5000 per ton. In contrast, the current price for sodium carbonate is only about $150 per ton, almost 35 times lower than the lithium counterpart. In addition, Na-based batteries can take advantage of a favorable redox potential ($E^0_{(Na/Na^+)}$=−2.71 V vs. the standard hydrogen electrode, only 0.3 V above that of $E^0_{(Li/Li^+)}$) and similar intercalation chemistry to Li$^+$ cations (H. Pan el al. *Energy & Environmental Science*, 2013, 6, 2338-2360; V. Palomares el al. *Energy & Environmental Science*, 2013, 6, 2312-2337).

To date, commercial Na metal batteries employ high temperatures (>250° C.) for Na—S (sulfur) or ZEBRA (Na—NiCl$_2$) batteries in which the Na metal is a molten liquid and a solid ceramic electrolyte (e.g., β"-alumina) is used to protect the highly reactive Na metal. The operation at high temperature, however, complicates the materials selection, manufacturing, operating system and hazards associated with large batteries. There has been significant interest in recent years in Na-ion batteries in which Na$^+$ cations are intercalated into hard carbon or form alloys (similar to Li-ion batteries) at the anode and thus are not reduced to Na metal, but the limited capacity and low rate (i.e., power) of these anodes significantly limits the energy density obtainable from these Na-ion batteries. The specific capacity is reduced due to the need to stabilize Na$^+$ cations with carbon, with alloying metals/phosphorus, or within metal oxides and sulfides. In addition, the working voltage of such anodes is often well above that of the Na/Na$^+$ couple resulting in a significantly lower battery voltage (than for Li-ion batteries) and thus a much lower energy storage capability when the anode is paired with a cathode in a battery cell.

Thus, it is ideal to use Na metal as an anode to maximize the energy density and power capability of Na batteries. However, tremendous difficulties have been encountered by battery researchers/developers when utilizing this anode due to the instability of Na metal in conventional electrolytes, which has limited the plating/stripping coulombic efficiency (CE) resulting in poor cycling characteristics due to rapid capacity fading.

SUMMARY

This disclosure concerns embodiments of a concentrated, nonaqueous electrolyte for use in a sodium battery, batteries including the concentrated electrolyte, and methods of making the batteries.

The electrolyte includes a sodium salt and a nonaqueous solvent, the electrolyte having a sodium salt concentration ≥2.5 M or a solvent-sodium salt mole ratio ≤4:1. In some embodiments, the sodium salt is NaFSI or a sodium salt mixture comprising at least 20 mol % NaFSI based on total sodium salt content. In certain embodiments, the sodium salt mixture further comprises NaTFSI, NaPF$_6$, or a combination thereof. In any or all of the above embodiments, the nonaqueous solvent may be an ether, an organic carbonate, or a mixture thereof. In some embodiments, the nonaqueous solvent is DME, diglyme, tetrahydrofuran, or a mixture thereof. In one embodiment, the nonaqueous electrolyte consists essentially of (i) NaFSI or a sodium salt mixture consisting of (a) at least 20 mol % NaFSI based on total sodium salt content and (b) NaTFSI, NaPF$_6$, or NaTFSI and NaPF$_6$; and (ii) DME, diglyme, or tetrahydrofuran, wherein the nonaqueous electrolyte, when prepared, has a total sodium salt concentration of 2.5-5 M or a solvent-sodium salt mole ratio from 4:1 to 1:1. In another embodiment, the nonaqueous electrolyte consists essentially of (i) NaFSI or a sodium salt mixture consisting of (a) at least 20 mol % NaFSI based on total sodium salt content and (b) one or more sodium salts other than NaFSI; and (ii) DME, wherein the nonaqueous electrolyte, when prepared, has a total sodium salt concentration of at least 2.5 M or a DME-sodium salt mole ratio ≤4:1. The nonaqueous electrolyte may further include a non-electrochemically active additive.

Embodiments of a rechargeable battery include a nonaqueous electrolyte as disclosed herein, an anode current collector in the absence of anode or an anode comprising Na metal or a sodium intercalation material or a sodium conversion compound, and a nonaqueous cathode comprising a sodium intercalation compound or a sodium conversion compound, an oxygen cathode, or a sulfur cathode. In one embodiment, the battery comprises a sodium metal anode. In an independent embodiment, the battery comprises an anode current collector, such as an anode current collector comprising carbon, copper, nickel, iron, stainless steel or other metals that are stable when in contact with Na and the nonaqueous electrolyte in an operating voltage window of the battery, or combinations thereof. In another independent embodiment, the anode comprises a sodium intercalation compound or a sodium conversion compound.

In any or all of the above embodiments, the cathode may be a free standing film including sodium-containing compounds mixed with a conductive additive and binder. The cathode may further comprise a cathode current collector, wherein the cathode current collector comprises carbon, aluminum, nickel, stainless steel, titanium, or copper. In another independent embodiment, the cathode is an oxygen cathode or a sulfur cathode.

A rechargeable battery as disclosed herein is made by (a) providing (i) an anode current collector in the absence of an anode or an anode comprising sodium and (ii) a nonaqueous cathode comprising a sodium intercalation compound or a sodium conversion compound, an oxygen cathode, or a sulfur cathode; and (b) providing a nonaqueous electrolyte comprising a sodium salt and a nonaqueous solvent, the nonaqueous electrolyte having a sodium salt concentration ≤2.5 M or a solvent-sodium salt mole ratio ≤4:1. In some embodiments, the battery, prior to cycling, comprises an anode current collector and does not comprise an anode. In such embodiments, an anode comprising sodium is formed in situ on a surface of the anode current collector during the charging process of the battery, and the anode is at least partially consumed during a discharging process of the battery.

The foregoing and other objects, features, and advantages of the invention will become more apparent from the following detailed description, which proceeds with reference to the accompanying figures.

BRIEF DESCRIPTION OF THE DRAWINGS

FIG. 5A is an image of Na metal on a Cu electrode after the first plating cycle. FIG. 5B is a magnified image of the electrode of FIG. 5A. FIG. 5C is an image of Na metal on the Cu electrode after the fifth plating cycle. FIG. 5D is an image of the Na metal counter electrode after the fifth plating cycle.

DETAILED DESCRIPTION

Figure 1A:
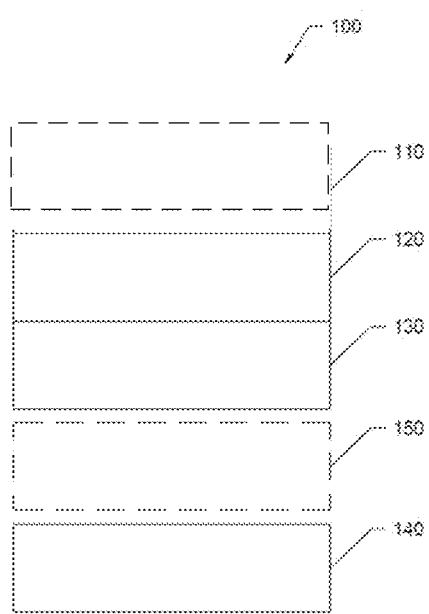
FIG. 1A is a schematic diagram of an anode-free rechargeable battery.

Many challenges need to be addressed before Na metal can be used as an anode in a battery with liquid or polymer electrolytes. For example, Na metal suffers from dendrite growth when plating in conventional electrolytes, which may result in an internal short-circuit in a battery and lead to a major safety concern. The dendrite growth of Na metal in Na-oxygen (O$_2$) batteries can also easily penetrate the separator. Additionally, Na metal is even more reactive than Li and can easily react with or be corroded by many organic solvents including carbonates and ethers. The low CE typically found with electrolytes is another drawback that stems from the instability of conventional electrolytes, which leads to a short cycle life for sodium batteries with liquid electrolytes having organic solvents. For example, Na metal anodes cycle very poorly in conventional electrolytes such as 1 M NaPF$_6$ or sodium perchlorate (NaClO$_4$) in carbonate solvents with a CE typically <40% (the ratio between Na plating capacity vs. Na stripping capacity) resulting in a very limited anode cycle life.

Embodiments of a concentrated electrolyte for use in a Na battery are disclosed. Batteries including the concentrated electrolyte and methods of making the batteries also are disclosed. The concentrated electrolyte minimizes or prevents dendrite growth. Na batteries including the concentrated electrolyte have increased CE and greater cycling stability as compared to batteries with conventional electrolytes. Advantageously, embodiments of the disclosed batteries may include a Na metal anode, may be anode-free (i.e., use a current collector alone in lieu of an anode consisting of a current collector with Na metal in the initial configuration), or may include an anode comprising a Na intercalation compound or a Na conversion compound. In some embodiments, the Na battery is a nonaqueous, rechargeable Na-ion, Na—$O_2$, or Na—S battery.

I. DEFINITIONS AND ABBREVIATIONS

The following explanations of terms and abbreviations are provided to better describe the present disclosure and to guide those of ordinary skill in the art in the practice of the present disclosure. As used herein, "comprising" means "including" and the singular forms "a" or "an" or "the" include plural references unless the context clearly dictates otherwise. The term "or" refers to a single element of stated alternative elements or a combination of two or more elements, unless the context clearly indicates otherwise.

Unless explained otherwise, all technical and scientific terms used herein have the same meaning as commonly understood to one of ordinary skill in the art to which this disclosure belongs. Although methods and materials similar or equivalent to those described herein can be used in the practice or testing of the present disclosure, suitable methods and materials are described below. The materials, methods, and examples are illustrative only and not intended to be limiting. Other features of the disclosure are apparent from the following detailed description and the claims.

Unless otherwise indicated, all numbers expressing quantities of components, molecular weights, percentages, temperatures, times, and so forth, as used in the specification or claims are to be understood as being modified by the term "about." Accordingly, unless otherwise implicitly or explicitly indicated, or unless the context if properly understood by a person of ordinary skill in the art to have a more definitive construction, the numerical parameters set forth are approximations that may depend on the desired properties sought and/or limits of detection under standard test conditions/methods as known to those of ordinary skill in the art. When directly and explicitly distinguishing embodiments from discussed prior art, the embodiment numbers are not approximates unless the word "about" is recited.

In order to facilitate review of the various embodiments of the disclosure, the following explanations of specific terms are provided:

Anode: An electrode through which electric charge flows into a polarized electrical device. From an electrochemical point of view in a rechargeable battery, positively-charged cations move away from the anode during discharge to balance the electrons leaving via external circuitry. When the battery is recharged, the anode becomes the positive terminal where electrons flow in and metal cations are reduced. For the purposes of this disclosure, "anode-free" refers to an initial cell configuration in which only an anode current collector is present with no electrochemically active material.

Cathode: An electrode through which electric charge flows out of a polarized electrical device. From an electrochemical point of view in a rechargeable battery, positively charged cations move toward the cathode during discharge to balance the electrons arriving from external circuitry. When the battery is recharged, the cathode becomes the negative terminal where electrons flow out and metal atoms (or cations) are oxidized.

Cell: As used herein, a cell refers to an electrochemical device used for generating a voltage or current from a chemical reaction, or the reverse in which a chemical reaction is induced by a current. Examples include voltaic cells, electrolytic cells, redox flow cells, and fuel cells, among others. Multiple single cells can form a cell assembly, often termed a stack. A battery includes one or more cells, or even one or more stacks.

Conversion compound: A compound comprising one or more cations, which are displaced by Na when a Na battery is discharged. For example, when iron(II) selenide (FeSe) is used as a cathode material, Fe is replaced by Na during discharge:

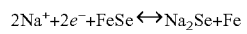

$$2Na^+ + 2e^- + FeSe \leftrightarrow Na_2Se + Fe$$

Coulombic efficiency (CE): The efficiency with which charges are transferred in a system facilitating an electrochemical reaction. For a battery, CE may be defined as the amount of charge exiting the battery during the discharge step divided by the amount of charge entering the battery during the charge step. For a half-cell, CE may be defined as the amount of charge entering the battery during the charge step divided by the amount of charge exiting the battery during the discharge step. Coulombic efficiency as reported herein refers to the amount of charge passed through cells during Na stripping from a Cu substrate divided by the amount of charge passed through cells during Na plating onto the Cu substrate.

Current collector: A battery component that conducts the flow of electrons between an electrode and a battery terminal. The current collector may also provide mechanical support for the electrode's active material. For example, a metal mesh current collector may provide mechanical support for the carbon film of a carbon-based air electrode and also allows oxygen and liquid electrolyte to pass through.

DME: 1,2-dimethoxyethane or monoglyme

EC: ethylene carbonate

Electrochemically active: As used herein, the term "electrochemically active" refers to a component (an element, an ion, or a compound) that significantly contributes to the energy conversions that ultimately enable the battery to deliver/store energy. By "significantly contributes" it is meant that the electrochemically active component contributes at least 10% of the energy conversions that ultimately enable the battery to deliver/store energy. In some embodiments, the electrochemically active component contributes at least 50%, at least 75%, at least 90%, or at least 95% of the energy conversions.

Electrolyte: As used herein, the term "electrolyte" refers to a nonaqueous solution of a sodium salt or a mixture of sodium salts dissolved in an organic solvent or a mixture of organic solvents.

FSI: bis(fluorosulfonyl)imide (i.e., $N(SO_2F)_2^-$)

DG: diethylene glycol dimethyl ether or diglyme

Intercalation: A term referring to the insertion of a material (e.g., an ion or molecule) into the microstructure of another material. For example, Li$^+$ cations can insert, or intercalate, into graphite (C) to form lithiated graphite (LiC$_6$).

Intercalation material: A compound capable of intercalating (inserting) ions reversibly without a significant irreversible change in microstructure. For example, a Li$^+$ cation insertion material is capable of intercalating Li$^+$ cations. One example of a Li$^+$ cation insertion material is graphite, which is often used in Li-ion batteries. Li$^+$ cations intercalate into the carbon structure to form LiC$_6$. Li$^+$ cations can also be extracted from LiC$_6$ to re-form graphite without an irreversible change in its microstructure.

Nonaqueous: Not including water, specifically including no more than trace amounts (<100 ppm) of water.

PC: propylene carbonate

Separator: A battery separator is a porous sheet or film placed between the anode and cathode. It prevents physical contact between the anode and cathode while facilitating ionic transport.

TFSI: bis(trifluoromethanesulfonyl)imide (i.e., N(SO$_2$CF$_3$)$_2$-)

THF: tetrahydrofuran

II. ELECTROLYTES

Embodiments of a nonaqueous electrolyte for Na-based battery comprise, consist essentially of, or consist of a sodium salt or mixture of sodium salts dissolved in a nonaqueous solvent, i.e., an organic solvent or a mixture of organic solvents. As used herein, the term "consist essentially of" means that the electrolyte does not include any electrochemically active component other than the sodium salt, and that the electrolyte includes no more than trace amounts (<100 ppm) of water. The term "consists essentially of" also means that the electrolyte may include other non-electrochemically active components, such as additives, that do not affect battery performance. Typical additives that do not affect the battery performance may include nonmetal halide salts, such as ammonium chloride (NH$_4$Cl) or tetraethylammonium chloride (Et$_4$NCl).

In some embodiments, the organic solvent is an ether, an organic carbonate, or any combination thereof. Exemplary organic solvents include, but are not limited to, 1,2-dimethoxyethane (DME), diglyme (DG), triglyme, tetraglyme, diethyl ether, 1,3-dioxolane, 1,4-dioxane, tetrahydrofuran (THF), 2,5-dimethyltetrahydrofuran, ethylene carbonate, propylene carbonate (PC), dimethyl carbonate, ethyl methyl carbonate, diethyl carbonate, vinylene carbonate, fluoroethylene carbonate, vinyl ethylene carbonate, or a mixture thereof. In some embodiments, the organic solvent is DME, DG, THF, or a mixture thereof. In an independent embodiment, the organic solvent is DME.

Suitable sodium salts of the nonaqueous electrolyte are salts that are soluble in the organic solvent at a concentration of at least 2.5 M or at a solvent-salt mole ratio less than or equal to 4:1. The sodium salt can be an inorganic salt, an organic salt, or any mixture thereof. The sodium salt may be partially or fully dissociated into its ions in the electrolyte. Exemplary sodium salts include, but are not limited to, sodium bis(fluorosulfonyl)imide (NaN(SO$_2$F)$_2$, NaFSI), sodium hexafluoroarsenate (NaAsF$_6$), sodium hexafluorophosphate (NaPF$_6$), sodium trifluoromethanesulfonate (NaCF$_3$SO$_3$), sodium bis(perfluoroethanesulfonyl)imide (NaN(SO$_2$C$_2$F$_5$)$_2$, NaBETI), sodium bis(trifluoromethanesulfonyl)imide (NaN(SO$_2$CF$_3$)$_2$, NaTFSI), sodium bis(oxalato)borate (NaBOB), sodium difluoro(oxalato)borate (NaDFOB), sodium perchlorate (NaClO$_4$), sodium tetrafluoroborate (NaBF$_4$), sodium tris(pentafluoroethyl)trifluorophosphate (Na[(C$_2$F$_5$)$_3$PF$_3$], NaFAP), and mixtures thereof. In certain embodiments, the sodium salt comprises, consists essentially of, or consists of NaFSI.

In some embodiments, the nonaqueous electrolyte includes a combination of sodium salts, wherein one of the salts is NaFSI. NaFSI may provide at least 20 mol %, at least 40 mol %, at least 60 mol %, or at least 80 mol % of the sodium salt in the electrolyte. In one embodiment, the electrolyte includes a mixture of NaFSI and NaTFSI. In an independent embodiment, the electrolyte includes a mixture of NaFSI and NaPF$_6$.

Embodiments of the disclosed nonaqueous electrolytes include a high concentration of the sodium salt (i.e., the electrolyte is prepared with a sodium salt concentration of at least 2.5 M or the electrolyte is prepared with a solvent-sodium salt mole ratio less than or equal to 4:1. In some embodiments, the nonaqueous electrolyte, when prepared, has a Na$^+$ cation concentration of at least 2.5 M or a solvent-Na$^+$ cation mole ratio less than or equal to 4:1. In certain embodiments, the electrolyte is prepared with a sodium salt concentration, or Na$^+$ cation concentration, within a range of from 2.5 M to saturation, such as at least 2.5 M, at least 3 M, from 2.5-8 M, from 2.5-5 M, or from 3-5 M. In one embodiment, the sodium salt concentration is from 3-4 M. Alternatively, the sodium salt concentration may be expressed as a solvent-sodium salt mole ratio, or a solvent-Na$^+$ cation mole ratio, wherein the mole ratio when the electrolyte is prepared is less than or equal to 4:1 (4 moles solvent, 1 mole sodium salt (or Na$^+$ cations)), ≤3:1, ≤2:1, or ≤1.5:1, such as a solvent to salt mole ratio from 4:1 to 1:1, from 3:1 to 1:1, or from 2:1 to 1:1. In one embodiment, the solvent-sodium salt mole ratio is 2:1.

In some embodiments, the nonaqueous electrolyte comprises, consists essentially of, or consists of (i) NaFSI or a sodium salt mixture consisting of at least 20 mol % NaFSI based on total sodium salt content, (ii) DME, DG, or THF, wherein the electrolyte, when prepared, has a total sodium salt concentration of 3-5 M or a solvent-sodium salt mole ratio from 4:1 to 1:1. For example, the electrolyte may comprise, consist essentially of, or consist of DME and NaFSI, DG and NaFSI, or THF and NaFSI. In certain embodiments, the electrolyte consists essentially of or consists of DME-NaFSI, DME-NaFSI-NaTFSI including at least 20 mol % NaFSI based on total sodium salt content, DME-NaFSI-NaPF$_6$ including at least 20 mol % NaFSI based on total sodium salt, DG-NaFSI, or THF-NaFSI. Exemplary nonaqueous electrolytes include 3-5 M NaFSI in DME, DME-NaFSI with a solvent-sodium salt mole ratio from 4:1 to 1:1, DME-NaFSI-NaTFSI with a solvent-sodium salt mole ratio from 4:1 to 1:1 and including 20-80 mol % NaFSI based on total sodium salt content, DME-NaFSI-NaPF$_6$ with a solvent-sodium salt mole ratio from 4:1 to 1:1 and including 20-80 mol % NaFSI based on total sodium salt content, DG-NaFSI with a solvent-sodium salt mole ratio from 4:1 to 1:1, and THF-NaFSI with a solvent-sodium salt mole ratio from 4:1 to 1:1. In certain embodiments, the electrolyte consists essentially of 3-5 M NaFSI in DME, DME-NaFSI with a solvent-sodium salt mole ratio of 3:1 to 1:1, DME-NaFSI-NaTFSI with a solvent-sodium salt mole ratio of 2:1 and including 20-80 mol % NaFSI based on total sodium salt content, DME-NaFSI-NaPF$_6$ with a solvent-sodium salt mole ratio of 2:1 and including 60-80 mol % NaFSI based on total sodium salt content, DG-NaFSI with a solvent-sodium salt mole ratio of 2:1 to 1:1, or THF-NaFSI with a solvent-sodium salt mole ratio from 4:1 to 1:1.

Some embodiments of the disclosed nonaqueous electrolytes can form a stable solid electrolyte interphase (SEI) layer to minimize the reaction and consumption of selected ions during the charge/discharge processes of batteries, especially during a charge process when metal is deposited on the anode current collector or anode electrode.

III. RECHARGEABLE BATTERIES

Electrolytes as disclosed herein are useful in Na-based rechargeable batteries, including anode-free rechargeable batteries. The rechargeable battery may be a Na-ion battery, a Na—$O_2$ battery, or a Na—S battery. Some embodiments of the disclosed rechargeable batteries are operable at ambient temperature.

Embodiments of the rechargeable batteries include (i) a nonaqueous electrolyte as disclosed herein, (ii) an anode current collector and/or an anode comprising Na metal, (ii) a nonaqueous cathode comprising a Na-containing compound (such as an intercalation or conversion compound), oxygen, or sulfur, and, in many embodiments, (iii) a separator between the anode and cathode.

FIG. 1A is a schematic diagram of one embodiment of an anode-free rechargeable battery 100. The battery 100 includes a cathode 120, a separator 130 which, in some embodiments, is infused with an electrolyte, and an anode current collector 140. In some embodiments, the battery 100 also includes a cathode current collector 110. In some embodiments, the cathode 120 is a Na-containing cathode, which serves as a sodium source during a charging process of the battery. During a charging process of the battery 100, an anode 150 comprising Na metal is formed in situ on the surface of the anode current collector 140 facing the separator 130. By "in situ" is meant that the anode forms during a charging process of the battery. The anode active material 150 is at least partially consumed during a discharging process of the battery 100. In other words, Na metal deposited onto the current collector 140 to form an anode 150 during charging is oxidized during discharge to produce $Na^+$ cations. In some embodiments of an anode-free battery, all or substantially all (e.g., at least 90 wt % or at least 95 wt %) of the anode active material is consumed during the discharging process.

Figure 1B:
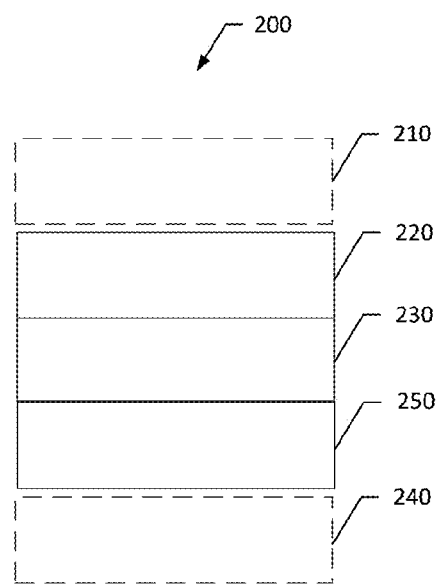
FIG. 1B is a schematic diagram of a rechargeable battery including an anode and a cathode.

FIG. 1B is a schematic diagram of one embodiment of a rechargeable battery 200 including a cathode 220, a separator 230 which, in some embodiments, is infused with an electrolyte, and an anode 250 comprising sodium. In some embodiments, the battery 200 also includes a cathode current collector 210 and/or an anode current collector 240.

The anode current collector can be a metal or another conductive material such as, but not limited to, nickel (Ni), copper (Cu), iron (Fe), stainless steel, or conductive carbon materials. The current collector may be a foil, a foam, or a polymer substrate coated with a conductive material. Advantageously, the anode current collector is stable (i.e., does not corrode or react) when in contact with sodium metal and the electrolyte in an operating voltage window of the battery. The anode current collector may be omitted if the anode is free standing, e.g., when the anode is sodium metal or a free-standing film comprising a sodium intercalation material or sodium conversion compound. By "free-standing" is meant that the film itself has sufficient structural integrity that the film can be positioned in the battery without a support material. In some embodiments, the rechargeable battery includes an anode comprising sodium. In one embodiment, the anode is Na metal. In an independent embodiment, the anode is a sodium intercalation material or a sodium conversion compound. The sodium intercalation material or sodium conversion compound may be deposited onto a substrate (e.g., a current collector) or provided as a free-standing film, typically including one or more binders and/or conductive additives. The sodium intercalation compound may be a sodium transition metal oxide or sodium transition metal phosphate. Exemplary intercalation compounds include, but are not limited to, $NaFePO_4$, $Na_2FePO_4F$, $Na_2FeP_2O_7$, $Na_3V_2(PO_4)_3$, $Na_3V_2(PO_4)_2F_3$, $NaVPO_4F$, $NaVPOPOF$, $Na_{1.5}VOPO_4F_{0.5}$, $NaCo_2O_4$, $Na_2Ti_3O_7$, and $Na_xMO_2$ where $0.4 < x \leq 1$, and M is a transition metal or a mixture of transition metals (e.g., $NaCrO_2$, $NaCoO_2$, $Na_xCoO_2$ ($0.4 \leq x \leq 0.9$), $Na_{2/3}Ni_{1/3}Mn_{2/3}O_2$, $Na_{2/3}Fe_{1/2}Mn_{1/2}O_2$, $NaNi_{1/3}Fe_{1/3}Mn_{1/3}O_2$, $NaNi_{1/3}Fe_{1/3}Co_{1/3}O_2$, $NaNi_{1/2}Mn_{1/2}O_2$), prussian blue analogue (PBA) cathodes, viz., $Na_xM_y[Fe(CN)_6]z \cdot nH_2O$, for which M is either Mn or Fe bridged by C≡N ligands to form an open framework suitable for intercalation of sodium ions. Other sodium intercalation materials include $Na_4Ti_5O_{12}$, $Fe_3O_4$, $TiO_2$, $Sb_2O_4$, Sb/C composite, SnSb/C composite, amorphous P/C composite, and combinations thereof. In an independent embodiment, the anode is a sodium conversion compound in which sodium displaces another cation, such as FeSe, $CuWO_4$, CuS, CuO, CuCl, or $CuCl_2$.

Suitable binders include, but are not limited to, polyvinyl alcohol, polyvinyl chloride, polyvinyl fluoride, ethylene oxide polymers, polyvinylpyrrolidone, polyurethane, polytetrafluoroethylene, polyvinylidene fluoride, polyethylene, polypropylene, styrene-butadiene rubber, epoxy resin, nylon, and the like. Suitable conductive additive include, but are not limited to, carbon black, acetylene black, Ketjen black, carbon fibers (e.g., vapor-grown carbon fiber), metal powders or fibers (e.g., Cu, Ni, Al), and conductive polymers (e.g., polyphenylene derivatives).

The separator may be glass fiber, a porous polymer film (e.g., polyethylene- or polypropylene-based material) with or without a ceramic coating, or a composite (e.g., a porous film of inorganic particles and a binder). One exemplary polymeric separator is a Celgard™ 2045 membrane. The separator may be infused with an electrolyte, as disclosed herein. A separator may be omitted, however, if, for example, a resistive interface is formed which prevents direct contact between the cathode or electrolyte and the anode or in situ formed anode material.

The cathode current collector can be a metal or another conductive material such as, but not limited to, Al, Ni, titanium, stainless steel, copper, or conductive carbon (e.g., carbon paper). The cathode current collector may be omitted if the cathode is a free-standing film.

In some embodiments, the cathode is either a free-standing film with conductive additive and binder or deposited on a conductive substrate which is stable with the electrolyte within the operation voltage window of the battery. In certain embodiments, the battery is a Na—$O_2$ battery and the cathode is oxygen, or the battery is a Na—S battery and the cathode has sulfur as an active material.

In one embodiment (e.g., FIG. 1A), the battery 100 is assembled in a fully discharged state with the active ions stored in the cathode 120. During the initial charge process, sodium ions are extracted from the cathode 120 and deposited on the anode current collector 140 to form the anode 150. During the discharge process, the anode 150 will serve as the ion source for the intercalation or conversion process of the cathode 120.

In some embodiments, the cathode is a sodium intercalation compound such as a sodium transition metal oxide or sodium transition metal phosphate. Exemplary intercalation compounds include, but are not limited to, NaFePO$_4$, Na$_2$FePO$_4$F, Na$_2$FeP$_2$O$_7$, Na$_3$V$_2$(PO$_4$)$_3$, Na$_3$V$_2$(PO$_4$)$_2$F$_3$, NaVPO$_4$F, NaVPOPOF, Na$_{1.5}$VOPO$_4$F$_{0.5}$, NaCo$_2$O$_4$, Na$_2$Ti$_3$O$_7$, and Na$_x$MO$_2$ where 0.4<x≤1, and M is a transition metal or a mixture of transition metals (e.g., NaCrO$_2$, NaCoO$_2$, Na$_x$CoO$_2$ (0.4≤x≤0.9), Na$_{2/3}$Ni$_{1/3}$Mn$_{2/3}$O$_2$, Na$_{2/3}$Fe$_{1/2}$Mn$_{1/2}$O$_2$, NaNi$_{1/3}$Fe$_{1/3}$Mn$_{1/3}$O$_2$, NaNi$_{1/3}$Fe$_{1/3}$Co$_{1/3}$O$_2$, NaNi$_{1/2}$Mn$_{1/2}$Mn$_{1/2}$O$_2$), Prussian blue analogue (PBA) cathodes, viz., Na$_x$M$_y$[Fe(CN)$_6$]$_z$·nH$_2$O, for which M is either Mn or Fe bridged by C≡N ligands to form an open framework suitable for intercalation of sodium ions. Other sodium intercalation materials include Na$_4$Ti$_5$O$_{12}$, Fe$_3$O$_4$, TiO$_2$, Sb$_2$O$_4$, Sb/C composite, SnSb/C composite, amorphous P/C composite, and combinations thereof. In an independent embodiment, the cathode is a sodium conversion compound in which sodium displaces another cation, such as FeSe, CuWO$_4$, CuS, CuO, CuCl, or CuCl$_2$. In another independent embodiment, the cathode active material is in a liquid phase as a catholyte and either (i) a separator infused with an embodiment of the disclosed electrolytes separates the catholyte from the electrolyte or (ii) the active material dissolved within the disclosed electrolytes.

In any of the foregoing embodiments, the electrolyte may consist essentially of one or more sodium salts and one or more organic ether solvents, wherein the sodium salt concentration is 2.5-5 M or the electrolyte has a solvent-sodium salt mole ratio from 4:1 to 1:1. In some embodiments, the sodium salt comprises, consists essentially of, or consists of NaFSI. In some embodiments, the sodium salts consists essentially of a mixture of NaFSI, NaTFSI, NaPF$_6$, or a combination thereof, wherein the salt mixture includes at least 20 mol % NaFSI based on the total sodium salt content. In certain embodiments, the solvent comprises, consists essentially or, or consists of DME, DG, THF, or a combination thereof. In one embodiment, the salt is 3-5 M NaFSI and the solvent is DME. In an independent embodiment, the solvent is DG, the salt is NaFSI, and the electrolyte has a solvent-sodium salt mole ratio from 2:1 to 1:1. In another independent embodiment, the solvent, is THF, the salt is NaFSI, and the electrolyte has a solvent-sodium salt mole ratio from 4:1 to 1:1. In yet another independent embodiment, the solvent is DME and the salt is a mixture of NaFSI and NaTFSI, wherein the electrolyte has a solvent to sodium salt mole ratio of 2:1 and the salt mixture includes at least 20 mol % NaFSI based on total sodium salt content. In still another independent embodiment, the solvent is DME and the salt is a mixture of NaFSI and NaPF$_6$, wherein the electrolyte has a solvent to sodium salt mole ratio of 2:1 and the salt mixture includes at least 60 mol % NaFSI based on total sodium salt content.

Rechargeable batteries including an embodiment of the disclosed electrolytes exhibit exceptional cycling stability (e.g., as indicated by a substantially constant coulombic efficiency (CE), such as a CE that varies by less than 5% after the first 10-30 cycles) and are characterized by a high CE, such as a CE≥80%, ≥90%, or even ≥95%. In some embodiments, the rechargeable battery attains a CE≥80% within 10-30 charge-discharge cycles and maintains a CE≥80% for at least 100 charge-discharge cycles, at least 150 cycles, at least 200 cycles, at least 250 cycles, or at least 300 cycles. In certain embodiments, the rechargeable battery reaches a CE≥90% within 30 charge-discharge cycles and maintains a CE≥90% for at least 150 cycles, at least 200 cycles, at least 250 cycles, or at least 300 cycles.

In some examples, a Na metal anode was plated and stripped in a Cu∥Na cell for more than 150 cycles with a CE of 99% when the electrolyte was 4 M NaFSI in DME; the average CE was 98.8% over 300 cycles. In stark contrast, a comparable cell with an electrolyte of 1 M NaFSI in DME had a CE less than 30% and exhibited stable cycling for only 30 cycles.

IV. METHODS OF FORMING RECHARGEABLE BATTERIES

This disclosure also concerns methods of forming rechargeable batteries including embodiments of the disclosed electrolytes. In one embodiment, a method of forming a rechargeable battery includes utilizing an anode comprising sodium and a nonaqueous cathode with or without a current collector. The anode may be Na metal, a sodium intercalation material, or a sodium conversion compound. In certain embodiments, the anode is Na metal. The cathode may be a sodium intercalation material, a sodium conversion compound, oxygen, or sulfur. The cathode active material can be in a liquid phase as a catholyte. A nonaqueous electrolyte as disclosed herein is provided (i.e., a nonaqueous electrolyte comprising, consisting essentially of, or consisting of one or more sodium salts and one or more organic solvents, wherein the electrolyte has a sodium salt concentration ≥2.5 M or a solvent-sodium salt mole ratio ≤4:1). The method may further comprise placing a separator between the anode and the cathode, wherein the separator is infused with the electrolyte.

In an independent embodiment, a method of forming a rechargeable battery includes utilizing an anode comprising sodium and a cathode current collector in the absence of a cathode. The anode may be Na metal, a sodium intercalation material, or a sodium conversion compound. In certain embodiments, the anode is Na metal. A nonaqueous electrolyte as disclosed herein is provided. The method may further include placing a separator between the anode and the cathode, wherein the separator is infused with the electrolyte. The battery, prior to cycling, comprises a cathode current collector and does not comprise a cathode. During a discharging process of the battery, a cathode comprising sodium is formed in situ on the surface of the cathode current collector. The cathode is at least partially consumed during the recharging process of the battery.

In another independent embodiment, a method of forming a rechargeable battery includes utilizing an anode current collector in the absence of an anode and a cathode. The cathode may be a sodium intercalation material, a sodium conversion compound, oxygen, or sulfur. The cathode active material can be in a liquid phase as a catholyte. A nonaqueous electrolyte as disclosed herein is provided. The method may further comprise placing a separator between the anode and the cathode, wherein the separator is infused with the electrolyte. The battery, prior to cycling, comprises an anode current collector and does not comprise an anode. During an initial charging process of the battery, an anode comprising sodium is formed in situ on the surface of the anode current collector. The anode is at least partially consumed during a discharging process of the battery.

V. EXAMPLES

Example 1

4 M NaFSI or LiFSI in DME

Figures 2A, 2B:
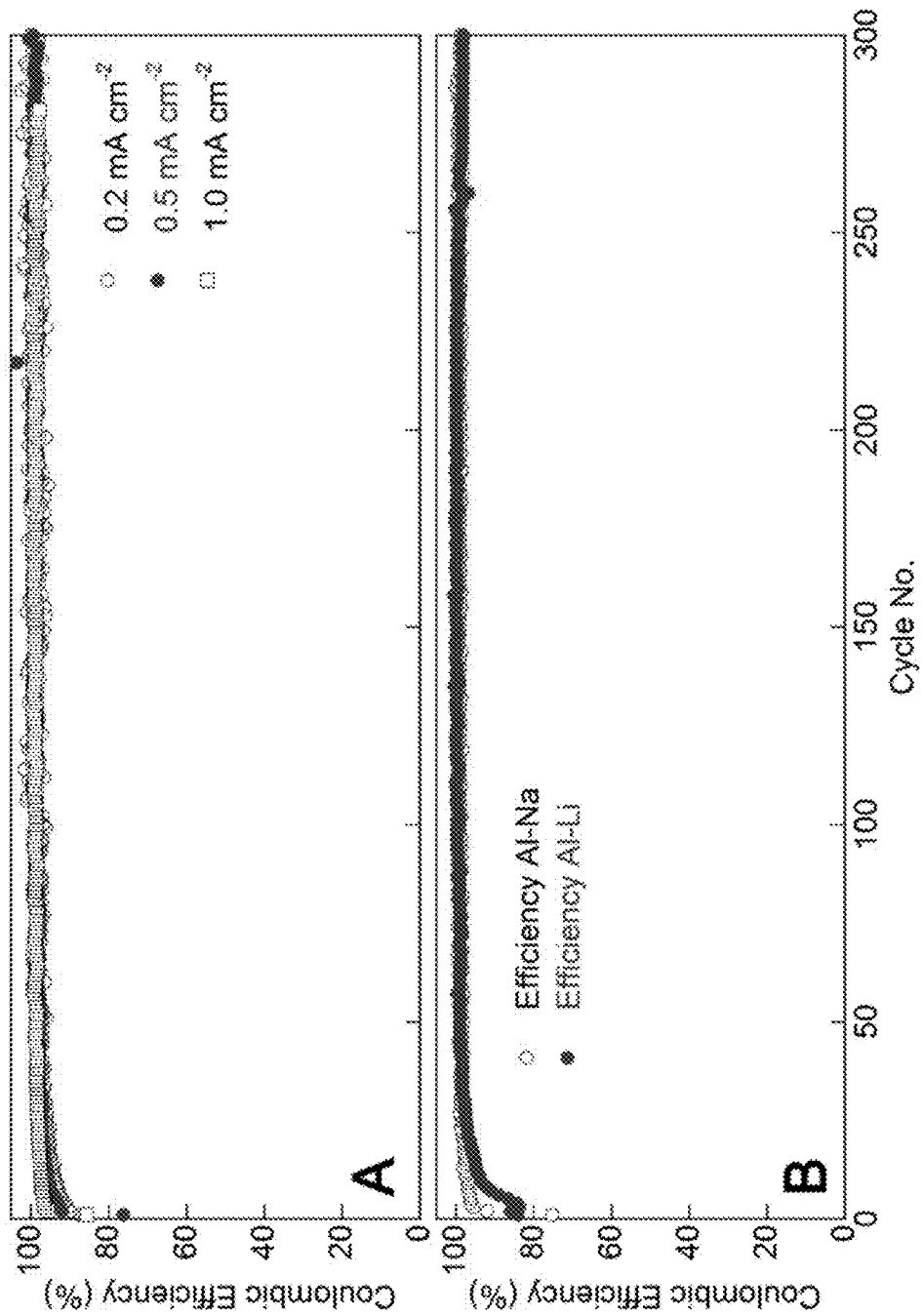
FIG. 2A shows Na plating/stripping profiles of Cu||Na (Cu is for the copper current collector) cells wherein the electrolyte was 4 M sodium bis(fluorosulfonyl)imide (NaFSI) in 1,2-dimethoxyethane (DME). The cells were cycled at current densities of 0.2 mA cm$^{-2}$, 0.5 mA cm$^{-2}$, and 1.0 mA cm$^{-2}$. "Plating" and 'stripping" refer to the Cu working electrode (i.e., "plating" refers to plating on the Cu electrode, which corresponds to stripping of the Na metal from the Na counter electrode).
FIG. 2B shows Na and Li plating/stripping profiles in Al||Na (Al is for the aluminum current collector) and Al||Li cells, respectively, wherein the electrolyte was 4 M NaFSI or 4 M lithium bis(fluorosulfonyl)imide (LiFSI), respectively, in DME. The cells were cycled at a current density of 0.5 mA cm$^{-2}$.

A highly concentrated electrolyte was prepared by dissolving the NaFSI or LiFSI salt into DME solvent to form a 4 M electrolyte. The 4 M NaFSI electrolyte was evaluated in a coin cell with a Na metal counter electrode, a copper current collector, and a glass fiber separator. The copper current collector was prepared by sonicating copper foil in a soap solution, rinsing three times with distilled water and acetone, and drying in a vacuum chamber. Na metal was purchased from Sigma-Aldrich and cut/rolled to make Na foil, which was used as the Na metal anode. Na metal was plated onto and then stripped from the Cu anode current collector at current densities of 0.2 mA cm$^{-2}$, 0.5 mA cm$^{-2}$, and 1.0 mA cm$^{-2}$. The CE for 300 cell cycles is shown in FIG. 2A. The first cycle CE was relatively low, but increased upon continued cycling, achieving an average value of 98.8% for the cell cycled at 0.5 mA cm$^{-2}$.

FIG. 2B shows the results for (i) 4 M NaFSI in an Al∥Na cell including a Na metal counter electrode and an Al anode current collector, and (ii) 4 M LiFSI in a Al∥Li coin cell including a Li metal counter electrode and an Al anode current collector. Both cells were cycled at 0.5 mA cm$^{-2}$. When Al is the current collector, the cell forms a Li–Al alloy during cycling; the capacity decreases quickly, although the CE appears stable.

Figure 3:
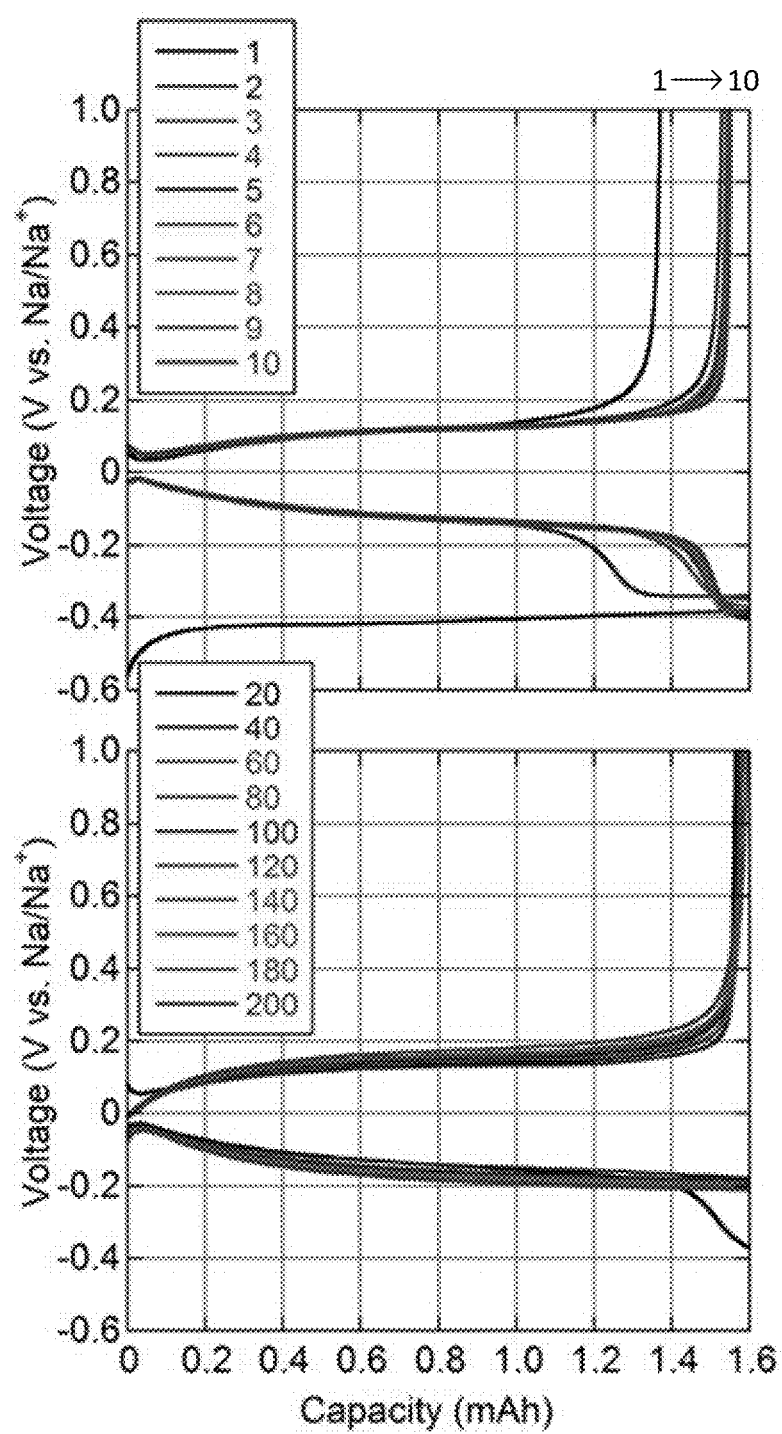
FIG. 3 shows voltage profiles for the cycling of a Cu||Na cell wherein the electrolyte was 4 M NaFSI in DME. The current density for the first two cycles was 1.0 mA cm$^{-2}$.

FIG. 3 shows that, during the first cycle plating of the Na metal on the Cu electrode at a current density of 1.0 mA cm$^{-2}$, the plating potential was quite low (<−0.4 V vs. Na/Na$^+$) and only a fraction of the input current was recovered on stripping the Na metal. Without wishing to be bound by a particular theory of operation, the Cu electrode may have a native oxide coating which reacts with the electrolyte. Passivation of this initial native oxide layer consumed part of charges transferred during the initial cycle and leads to smaller CE in the first cycle. Once this coating is removed or passivated, Na metal plating then occurs with high CE. The somewhat low CE values in the following initial cycles suggests that—along with the Na metal plating—side reactions are present, but the continuous improvement in the CE indicates that passivation occurs shortly thereafter for these reactions.

Figures 4A, 4B:
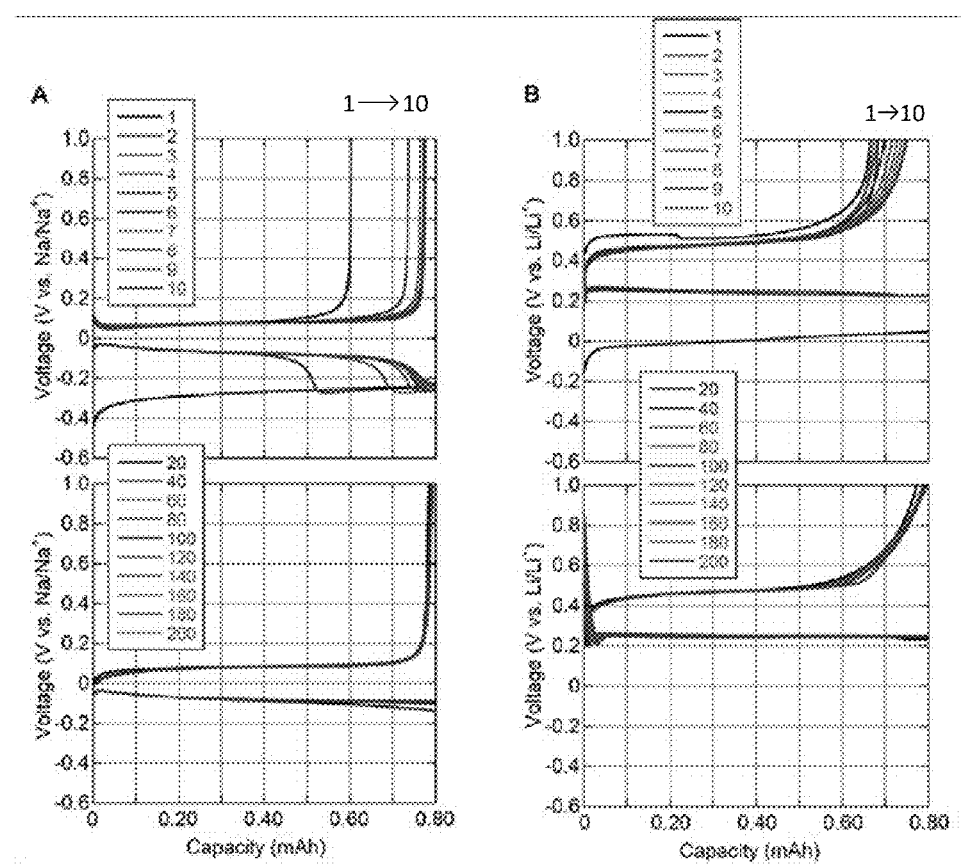
FIGS. 4A and 4B show voltage profiles for the cycling of an Al||Na cell with 4 M NaFSI in DME electrolyte (FIG. 4A) and an Al||Li with a 4 M LiFSI in DME electrolyte (FIG. 4B). The current density was 0.5 mA cm$^{-2}$ for each cell.

FIGS. 4A and 4B show the voltage profiles for cycling of the Al∥Na cell with a 4 M NaFSI in DME electrolyte (FIG. 4A) and the Al∥H Li cell with a 4 M LiFSI in DME electrolyte (FIG. 4B). The current density was 0.5 mA cm$^{-2}$ for each cell. Plating potentials again were low for the first cycle of each cell with improvement as cycling continued.

Optical images of the new and cycled electrodes showed that, after the first plating step, the Cu electrode was covered with a somewhat dull, uniform metallic layer which was removed upon stripping. A grayish residue remained on the Cu electrode providing the metallic layer with a dull appearance. After continued cycling, this grayish residue became a relatively uniform dark gray coating (after 20 or so cycles) which acts as a protective layer which shields the electrolyte from direct contact with the Cu electrode and thus acts in a similar manner to the solid electrolyte interfacial (SEI) layer formed on graphite anodes in Li-ion batteries.

Figures 5A, 5B, 5C, 5D:
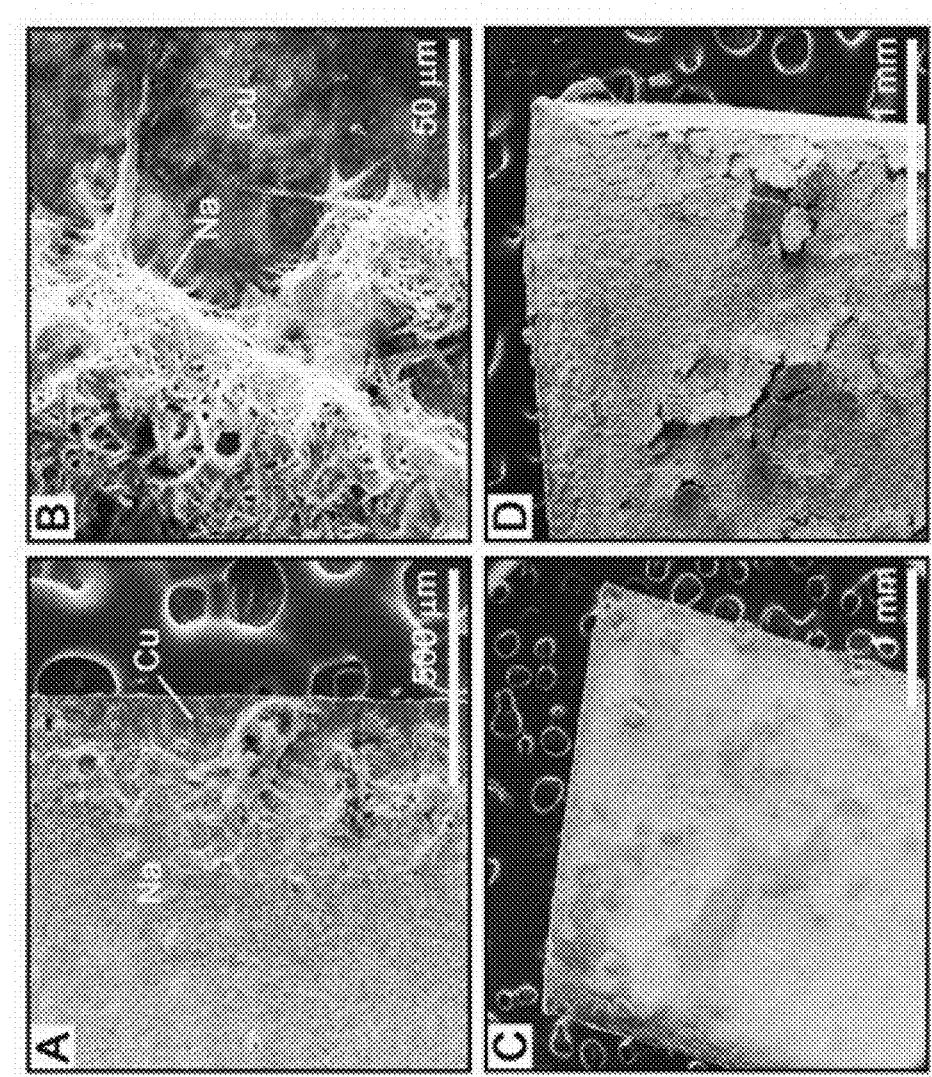
FIGS. 5A-5D are SEM images of Na and Cu electrodes.
Figure 6:
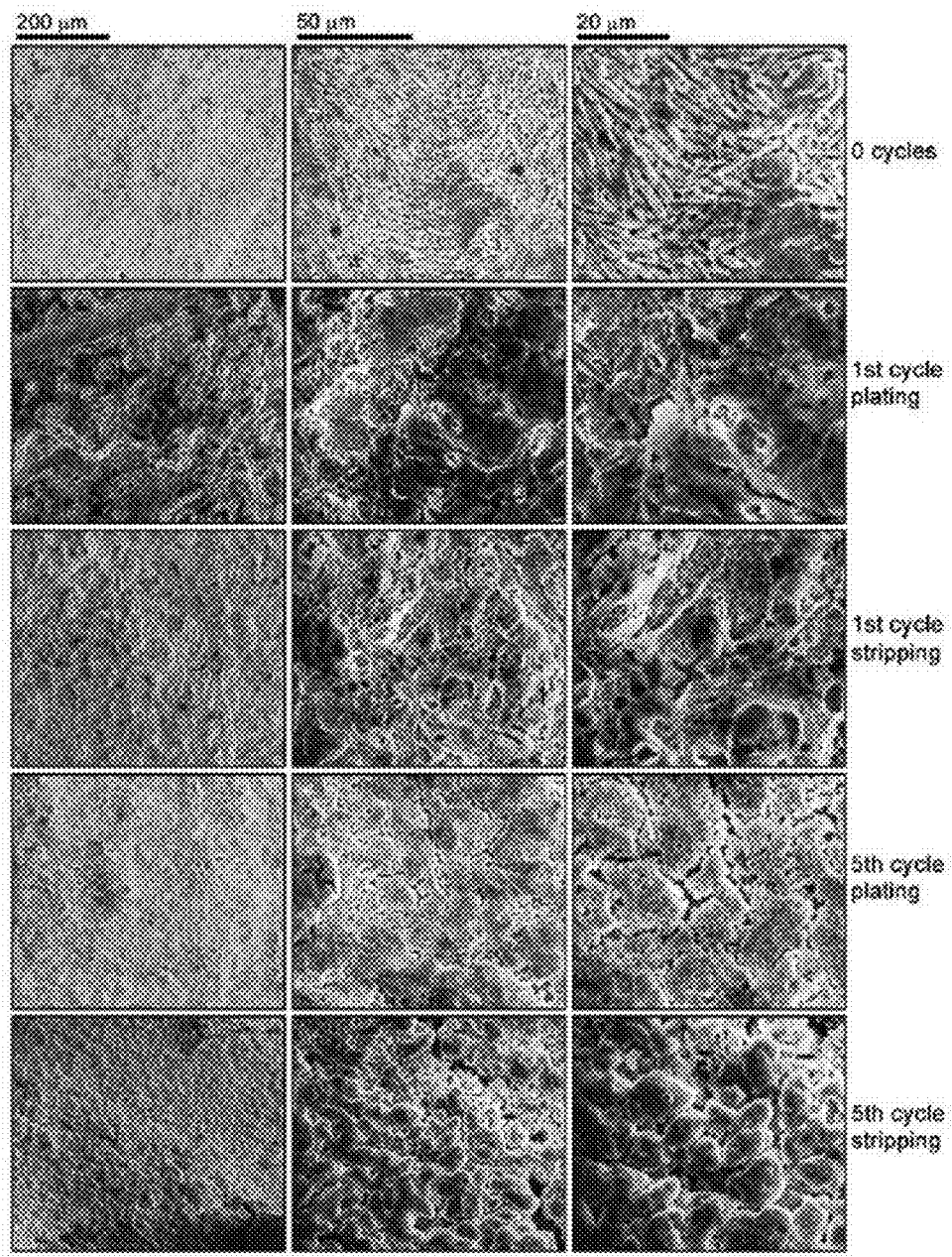
FIG. 6 shows SEM images of the Na metal electrodes before and after cycling in Cu||Na cells with a 4 M NaFSI in DME electrolyte ("plating" refers to plating on the Cu electrode, which corresponds to stripping of Na metal from the Na electrode).

SEM images of the Na metal plated onto the Cu electrode with the 4 M NaFSI-DME electrolyte in the first cycle (FIGS. 5A, 5B) revealed a flat, interwoven mat of Na metal which was very similar to that of the pristine Na metal of the Na counter electrode prior to cycling (FIG. 6). Upon continued cycling, the SEM images for both the Cu working and Na counter electrodes (FIGS. 5C and 5D, respectively) displayed the surface coating noted in the optical images (which cracked on the Na electrode upon drying).

Example 2

Effects of Salt, Concentration, and Solvent

Figures 7A, 7B:
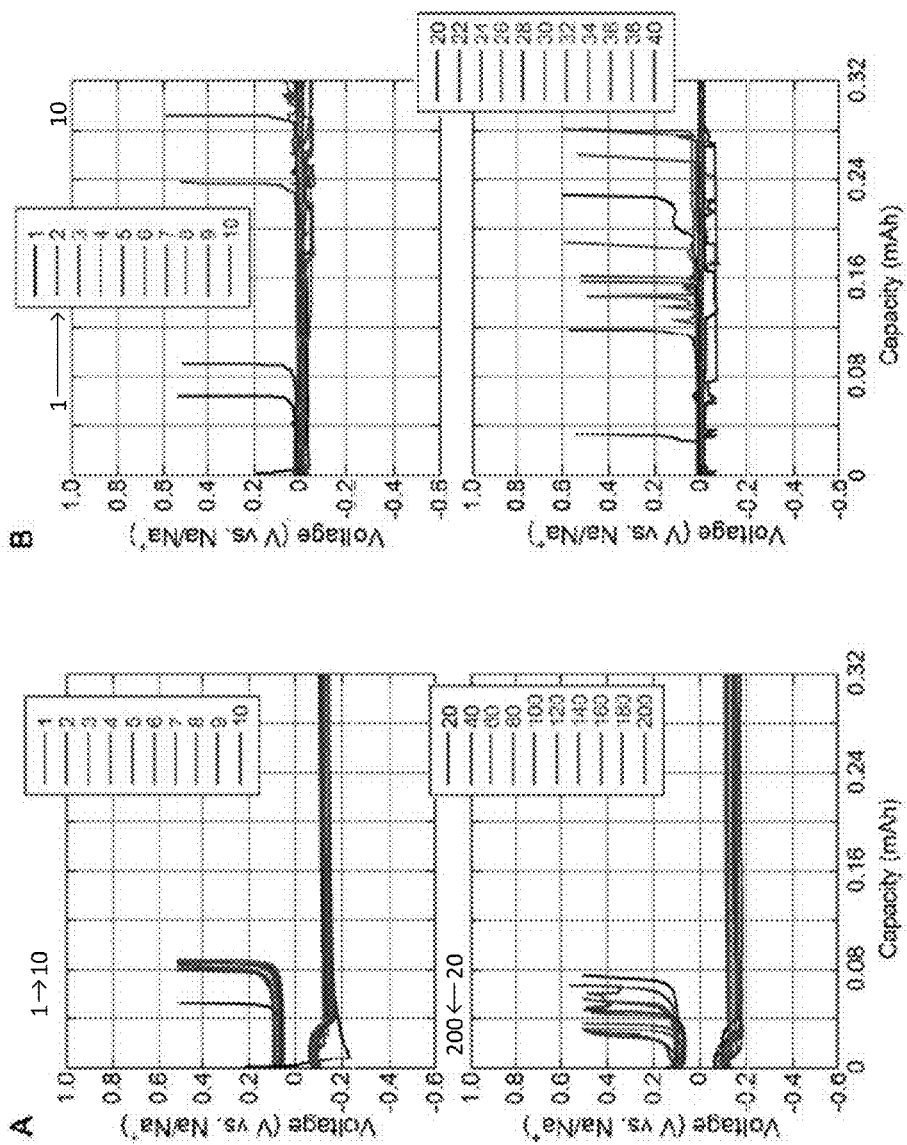
FIGS. 7A and 7B are voltage profiles for the cycling of Cu||Na cells including 1 M sodium hexafluorophosphate (NaPF$_6$) in ethylene carbonate (EC) and diethyl carbonate (DEC) (FIG. 7A) and 1 M NaFSI in DME (FIG. 7B) electrolytes at a current density of 0.2 mA cm$^{-2}$.
Figure 8:
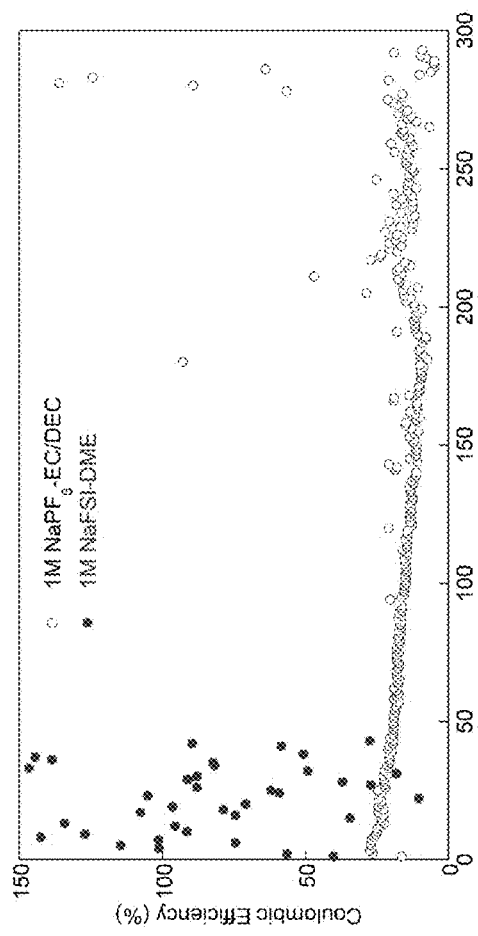
FIG. 8 shows the CE for the cycling of the Cu||Na cells of FIGS. 7A and 7B.

Electrolytes with various salts, solvents, and solvent-salt ratios were evaluated. Cu∥Na cells with glass fiber separators were prepared with the following electrolytes: 1 M NaPF$_6$ in EC/DEC, various concentrations of NaFSI in PC, varying concentrations of NaFSI in DME, and varying concentrations of NaTFSI. The 1 M NaPF$_6$ in EC/DEC electrolyte resulted in poor Na metal coverage of the Cu electrode and poor CE for the plating/stripping cycles (FIGS. 7A and 8). An SEM cross-sectional image indicated that some Na metal was plated onto the electrode during the plating steps, but this was underneath a surface coating which grew quite thick upon extensive cycling. The Na metal plating/stripping cycling stability was also poor for Cu electrodes cycled in the 1 M NaFSI in DME electrolyte (FIGS. 7B and 8). The CE varied greatly from cycle to cycle, often oscillating from a low value to a value exceeding 100%. This may occur due to poor electrical contact with the plated Na metal (resulting in "dead" Na in one cycle) for which electrical contact is reestablished in subsequent cycles enabling an excess amount of Na metal to be stripped (relative to the fixed amount plated during the cycle).

A Cu∥Na cell with 2 M NaFSI in DME exhibited a low CE of less than 20% in the first 10 cycles at a current density of 0.2 mA cm$^{-2}$. The CE then slowly increased to 60% in the following 20 cycles. After 30 cycles, the cell failed to show stable cycling with oscillations similar to those seen in the cell with the 1 M NaFSI in DME electrolyte.

Figure 9:
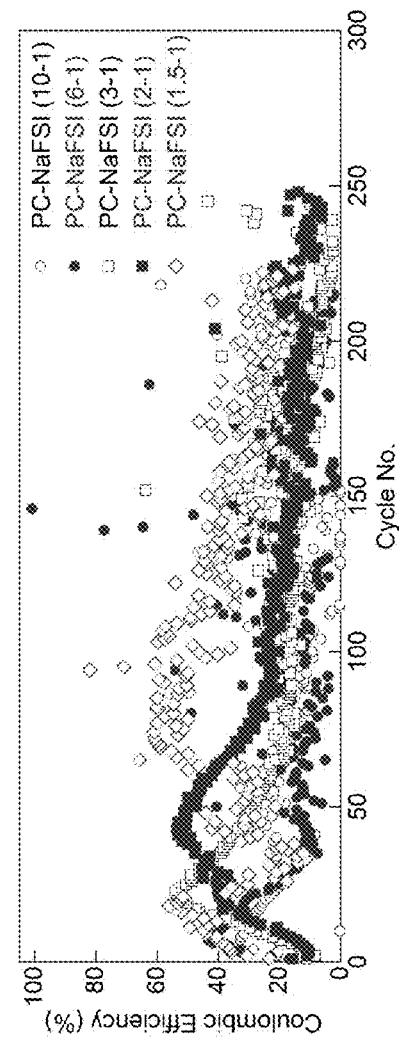
FIG. 9 shows the CE for the cycling of Cu||Na cells at a current density of 0.2 mA cm$^{-2}$ with NaFSI in propylene carbonate (PC) electrolytes having mole ratios of solvent-to-salt of 10:1, 6:1, 3:1, 2:1, and 1.5:1.

The use of another carbonate solvent (i.e., PC) enabled highly concentrated, liquid electrolytes to be prepared with the salt NaFSI. Electrolytes were prepared with PC-NaFSI mole ratios of 10:1, 6:1, 3:1, 2:1, and 1.5:1. The electrolytes were evaluated in Cu∥Na cells at a current density of 0.2 mA cm$^{-2}$. A poor CE was obtained on cycling the Cu electrode with the PC-NaFSI electrolytes, although some improvement was noted for the most concentrated electrolytes (FIG. 9). The poor results indicate that PC is highly reactive with plated Na metal, i.e., extensive side reactions occurred.

Figure 10:
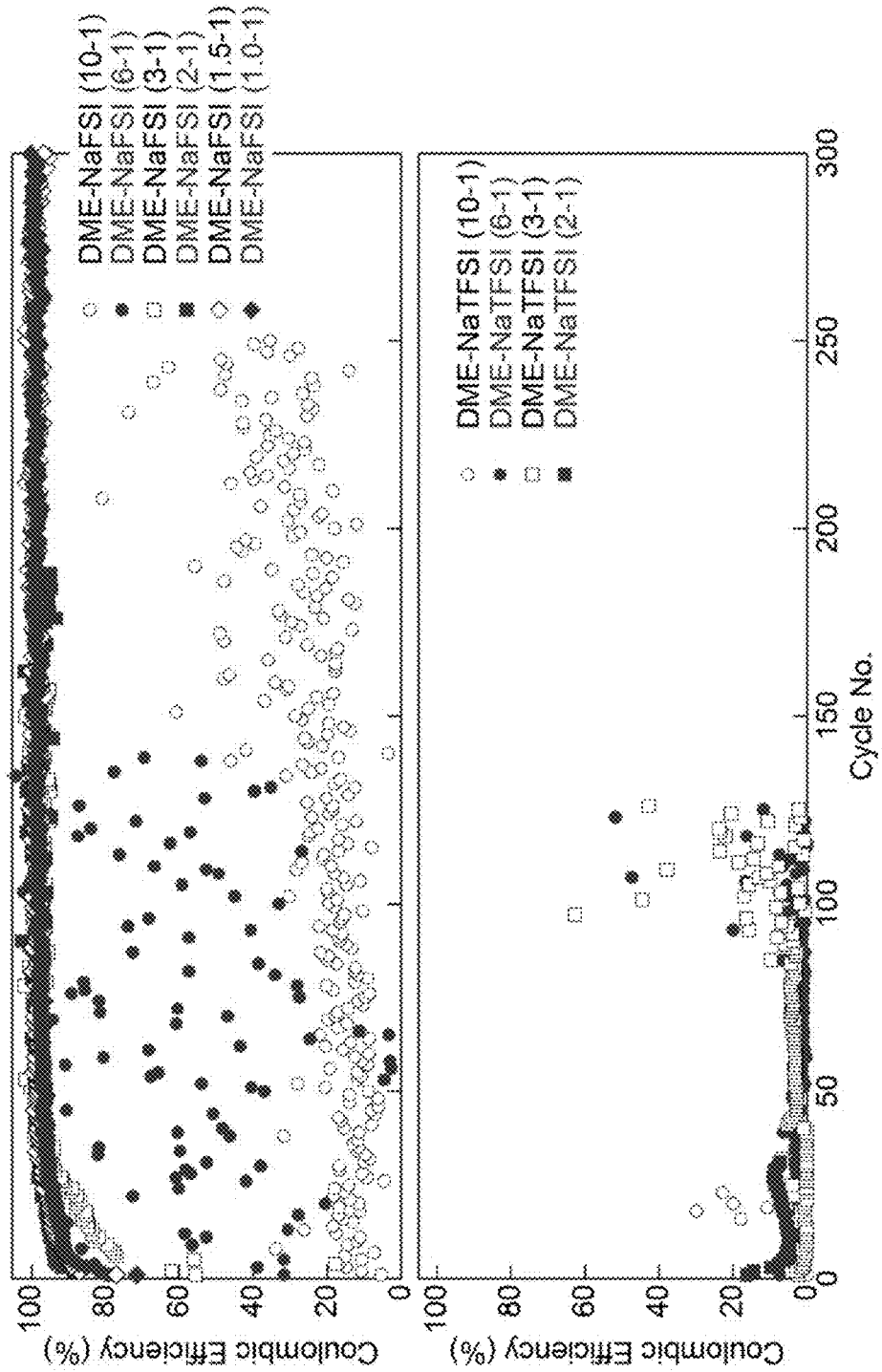
FIG. 10 shows the CE for the cycling of Cu||Na cells at a current density of 0.2 mA cm$^{-2}$ with NaFSI in DME electrolytes having mole ratios of solvent-to-salt of 10:1, 6:1, 3:1, 2:1, 1.5:1, and 1:1, and sodium bis(trifluoromethanesulfonyl)imide (NaTFSI) in DME electrolytes having mole ratios of solvent-to-salt of 10:1, 6:1, 3:1, and 2:1.

Electrolytes were prepared with DME-NaFSI mole ratios of 10:1, 6:1, 3:1, 2:1, 1.5:1, and 1:1, or DME-NaTFSI mole ratios of 10:1, 6:1, 3:1, and 2:1. The electrolytes were evaluated in Cu∥Na cells at a current density of 0.2 mA cm$^{-2}$. A poor CE was obtained with all of the DME-NaTFSI electrolytes (FIG. 10). In contrast, the CE increased with increasing concentrations of NaFSI (FIG. 10) with CE values near 100% when the DME-NaFSI ratio was 3:1 or less.

Figure 11:
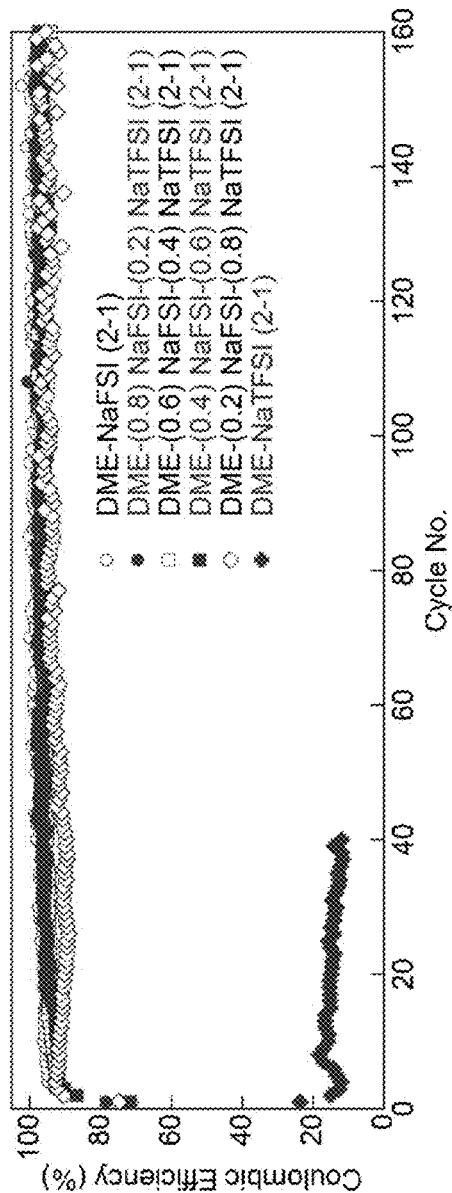
FIG. 11 shows the CE for the cycling of Cu||Na cells at a current density of 0.2 mA cm$^{-2}$ with electrolytes having a solvent-salt mole ratio of 2:1 with mixtures of NaFSI and NaTFSI salts in DME solvent, where salt mixtures include 0.8 NaFSI-0.2 NaTFSI; 0.6 NaFSI-0.4 NaTFSI; 0.4 NaFSI-0.6 NaTFSI in DME; 0.2 NaFSI-0.8 NaTFSI in DME, and NaTFSI.

Electrolytes were prepared with a constant solvent-salt mole ratio of 2:1 with DME as the solvent and mixtures of NaFSI and NaTFSI salts:
  i. DME-NaFSI
  ii. DME-0.8 NaFSI-0.2 NaTFSI
  iii. DME-0.6 NaFSI-0.4 NaTFSI
  iv. DME-0.4 NaFSI-0.6 NaTFSI
  v. DME-0.2 NaFSI-0.8 NaTFSI
  vi. DME-NaTFSI The electrolytes were evaluated in Cu∥Na cells at a current density of 0.2 mA cm$^{-2}$. As shown in FIG. 11, the cell with DME-NaTFSI electrolyte exhibited a poor CE (less than 20%), whereas cells with NaFSI and NaTFSI exhibited CE values of more than 80%, with the CE increasing as the proportion of NaFSI increased.

Figure 12:
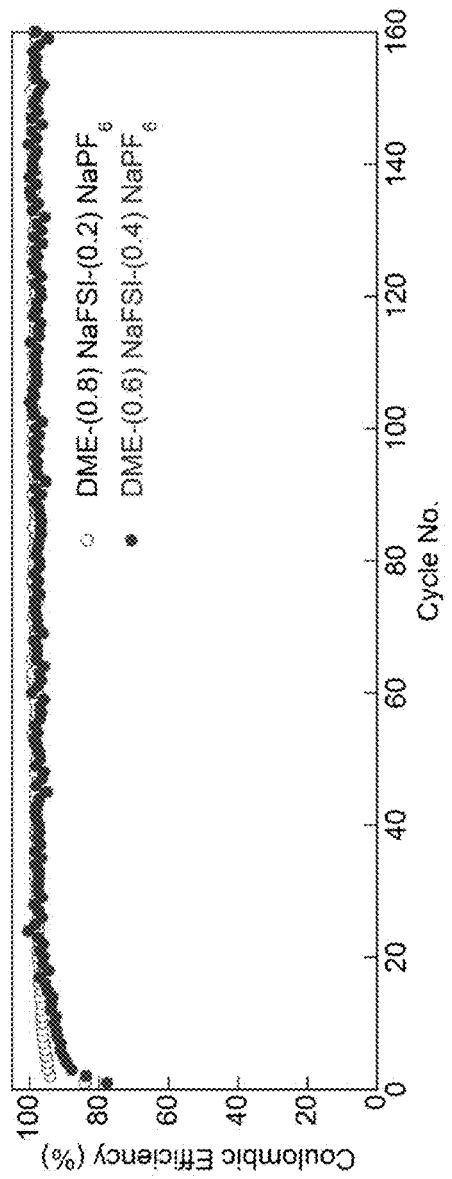
FIG. 12 shows the CE for the cycling of Cu||Na cells at a current density of 0.5 mA cm$^{-2}$ with electrolytes having a solvent-salt mole ratio of 2:1 with mixtures of NaFSI and NaPF$_6$ salts in DME solvent, where salt mixtures include 0.8 NaFSI-0.2 NaPF$_6$, and 0.6 NaFSI-0.4 NaPF$_6$.

Electrolytes were also prepared with a constant solvent-salt mole ratio of 2:1 and a mixture of NaFSI and NaPF$_6$ salts: DME-0.8 NaFSI-0.2 NaPF$_6$ and DME-0.6 NaFSI-0.4 NaPF$_6$. The electrolytes were evaluated in Cu||Na cells at a current density of 0.5 mA cm$^{-2}$. As shown in FIG. 12, the cell with less NaFSI initially had a lower CE, but after about 30 cycles, both cells demonstrated comparable performance with CE values greater than 90%.

Solvents were evaluated by preparing electrolytes in DG and THF at various solvent-salt mole ratios as follows:
  i. DG-NaFSI (4:3)
  ii. THF-NaFSI (4:1)
  iii. THF-NaFSI (3:1)
  iv. THF-NaFSI (2:1)

Figure 13:
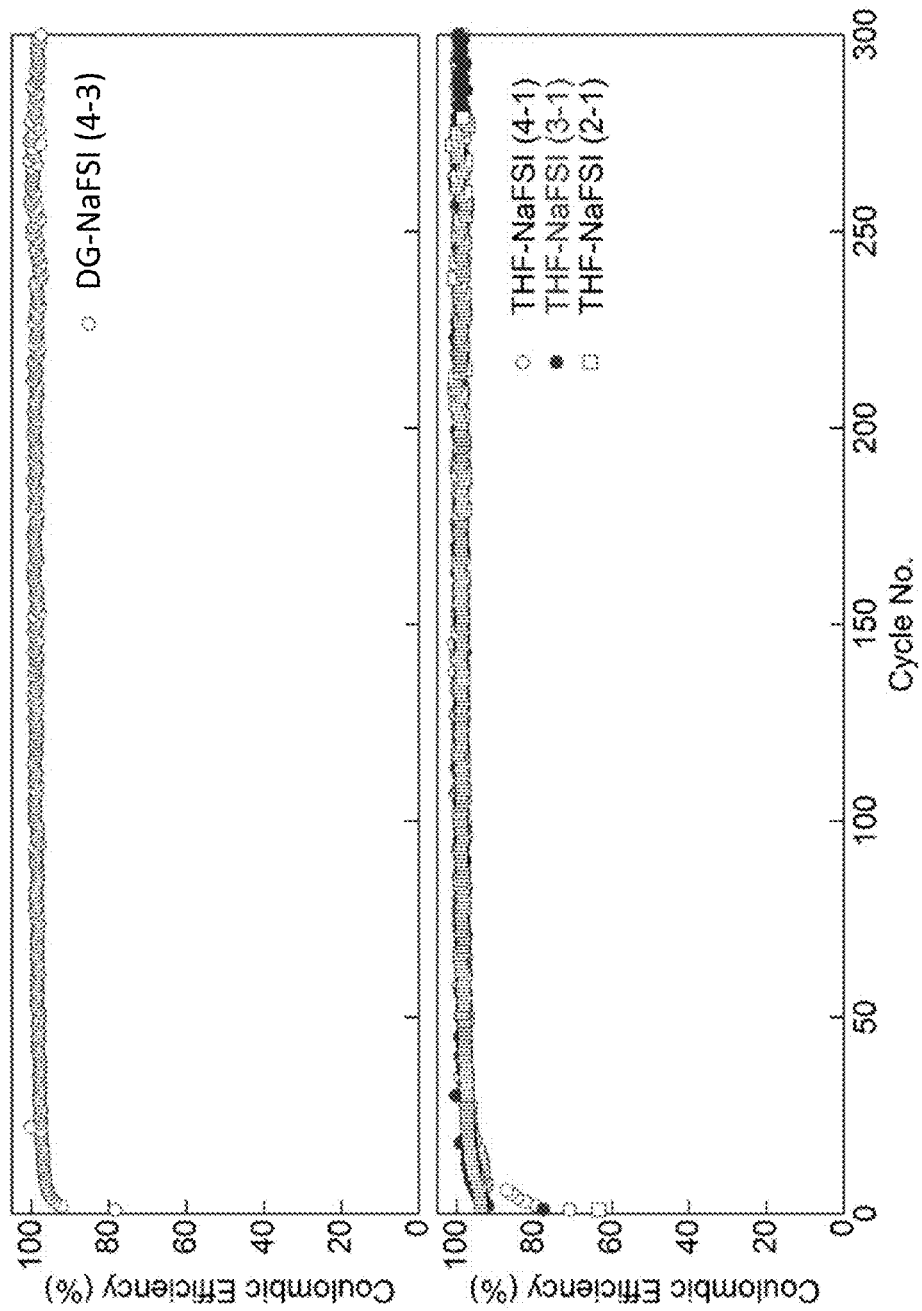
FIG. 13 shows the CE for the cycling of Cu||Na cells at a current density of 0.5 mA cm$^{-2}$ with electrolytes in diglyme (DG) or tetrahydrofuran (THF) at different mole ratios of solvent-to-salt: DG-NaFSI (4:3), THF-NaFSI (4:1), THF-NaFSI (3:1), and THF-NaFSI (2:1).

The electrolytes were evaluated in Cu||Na cells at a current density of 0.5 mA cm$^{-2}$. As shown in FIG. 13, all of the electrolytes provided high CE values, with the initial CE being greater with increased NaFSI concentration.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A rechargeable battery, comprising:
   a nonaqueous electrolyte comprising
   sodium bis(fluorosulfonylimide) (NaN(SO$_2$F)$_2$, NaFSI) or a sodium salt mixture comprising at least 20 mol % NaFSI based on total sodium salt content, and
   a nonaqueous solvent comprising an ether, the electrolyte having a solvent-sodium salt mole ratio <4:1;
   the nonaqueous solvent is 1,2-dimethoxyethane (DME), diglyme, triglyme, tetraglyme, diethyl ether, 1,3-dioxolane, 1,4-dioxane, tetrahydrofuran, 2,5-dimethyltetrahydrofuran, or a mixture thereof;
   an anode current collector in the absence of anode, or an anode comprising Na metal or a sodium intercalation material or a sodium conversion compound; and
   a nonaqueous cathode comprising a sodium intercalation compound or a sodium conversion compound, an oxygen cathode, or a sulfur cathode.

2. The rechargeable battery of claim 1, wherein the sodium salt mixture further comprises sodium hexafluoroarsenate (NaAsF$_6$), sodium hexafluorophosphate (NaPF$_6$), sodium trifluoromethanesulfonate (NaCF$_3$SO$_3$), sodium bis(perfluoroethanesulfonyl)imide (NaN(SO$_2$C$_2$F$_5$)$_2$, NaBETI), sodium bis(trifluoromethanesulfonyl)imide (NaN(SO$_2$CF$_3$)$_2$, NaTFSI), sodium bis(oxalato)borate (NaBOB), sodium difluoro(oxalato)borate (NaDFOB), sodium perchlorate (NaClO$_4$), sodium tetrafluoroborate (NaBF$_4$), sodium tris(pentafluoroethyl)trifluorophosphate (Na[(C$_2$F$_5$)$_3$ PF$_3$], NaFAP), or a combination thereof.

3. The rechargeable battery of claim 1, wherein the sodium salt is a sodium salt mixture comprising at least 20 mol % NaFSI based on total sodium salt content and the sodium salt mixture further comprises NaTFSI, NaPF$_6$, or a combination thereof.

4. The rechargeable battery of claim 1, wherein the nonaqueous electrolyte, when prepared, has a solvent to sodium salt mole ratio from 3:1 to 1:1.

5. The rechargeable battery of claim 1, wherein the nonaqueous solvent is DME, diglyme, tetrahydrofuran, or a mixture thereof.

6. The rechargeable battery of claim 1, wherein the nonaqueous electrolyte consists essentially of:
   (i) NaFSI or a sodium salt mixture consisting of (a) at least 20 mol % NaFSI based on total sodium salt content and (b) NaTFSI, NaPF$_6$, or NaTFSI and NaPF$_6$; and
   (ii) DME, diglyme, or tetrahydrofuran;
   wherein the nonaqueous electrolyte, when prepared, has a solvent-sodium salt mole ratio from 4:1 to 1:1.

7. The rechargeable battery of claim 6, wherein the nonaqueous electrolyte further includes a non-electrochemically active additive.

8. The rechargeable battery of claim 1, wherein the battery comprises a sodium metal anode.

9. The rechargeable battery of claim 1, wherein the battery comprises an anode current collector.

10. The rechargeable battery of claim 9, wherein the anode current collector comprises carbon, copper, nickel, iron, stainless steel or other metals that are stable when in contact with Na and the nonaqueous electrolyte in an operating voltage window of the battery, or combinations thereof.

11. The rechargeable battery of claim 1, wherein the anode comprises a sodium intercalation compound or a sodium conversion compound.

12. The rechargeable battery of claim 1, wherein the cathode is a free standing film including sodium-containing compounds mixed with a conductive additive and binder.

13. The rechargeable battery of claim 1, further comprising a cathode current collector, wherein the cathode current collector comprises carbon, aluminum, nickel, stainless steel, titanium, or copper.

14. The rechargeable battery of claim 1, wherein the battery comprises an oxygen cathode or a sulfur cathode.

15. A method of forming a rechargeable sodium battery of claim 1, comprising:
   providing (i) an anode current collector in the absence of an anode or an anode comprising sodium and (ii) a nonaqueous cathode comprising a sodium intercalation compound or a sodium conversion compound, an oxygen cathode, or a sulfur cathode; and providing a nonaqueous electrolyte.

16. The method of claim 15, wherein:
   the battery, prior to cycling, comprises an anode current collector and does not comprise an anode;
   an anode comprising sodium is formed in situ on a surface of the anode current collector during the charging process of the battery; and
   the anode is at least partially consumed during a discharging process of the battery.

* * * * *